(12) United States Patent
Woehrle et al.

(10) Patent No.: US 10,388,917 B2
(45) Date of Patent: Aug. 20, 2019

(54) METHOD AND APPARATUS FOR APPLYING A SELF-ADHESIVE FILM TO AN ELECTRICAL ENERGY STORAGE CELL

(71) Applicant: Bayerische Motoren Werke Aktiengesellschaft, Munich (DE)

(72) Inventors: Thomas Woehrle, Munich (DE); Tobias Zeilinger, Munich (DE); Hideki Ogihara, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 15/288,197

(22) Filed: Oct. 7, 2016

(65) Prior Publication Data

US 2017/0062776 A1    Mar. 2, 2017

Related U.S. Application Data

(63) Continuation of application No. PCT/EP2015/052907, filed on Feb. 12, 2015.

(30) Foreign Application Priority Data

Apr. 10, 2014 (DE) .................. 10 2014 206 890

(51) Int. Cl.
*H01M 2/02* (2006.01)
*H01M 10/04* (2006.01)
(Continued)

(52) U.S. Cl.
CPC .......... *H01M 2/0267* (2013.01); *B29C 63/04* (2013.01); *H01M 2/02* (2013.01); *H01M 2/028* (2013.01);
(Continued)

(58) Field of Classification Search
None
See application file for complete search history.

(56) References Cited

U.S. PATENT DOCUMENTS 5,017,442 A    5/1991  Watanabe et al.
2001/0031391 A1  10/2001  Hironaka et al.
(Continued)

FOREIGN PATENT DOCUMENTS

CN  102487130 A  6/2012
CN  102549801 A  7/2012
(Continued)

OTHER PUBLICATIONS

Oxford Dictionary, definition of self-adhesive in US English, Accessed Nov. 29, 2018. <<https://en.oxforddictionaries.com/defintion/us/self-adhesive>>.*
(Continued)

*Primary Examiner* — Alix E Eggerding
(74) *Attorney, Agent, or Firm* — Crowell & Moring LLP

(57) ABSTRACT

A method for the at least partial production of an electrical energy storage cell includes providing the electrode/separator arrangement, providing a plastics foil of self-adhesive form, and applying the self-adhesive plastics foil to at least a subregion of the arrangement surface. The energy storage cell has a storage cell housing in which there is accommodated an electrode/separator arrangement which is required for the operation of the energy storage cell. The electrode/separator arrangement has a layer structure with a sequence of cathode layers and anode layers. Opposite cathode and anode layers there are in each case separated from one another by a separator layer which is in of a porous form. The electrode/separator arrangement has an arrangement surface.

15 Claims, 6 Drawing Sheets

(51) Int. Cl.
  *H01M 10/058* (2010.01)
  *B29C 63/04* (2006.01)
  *H01M 10/0525* (2010.01)
  *H01M 10/0583* (2010.01)
  *H01M 10/0587* (2010.01)
  *B29K 67/00* (2006.01)
  *B29K 105/00* (2006.01)
  *B29L 31/34* (2006.01)

(52) U.S. Cl.
  CPC ....... *H01M 2/0237* (2013.01); *H01M 2/0257* (2013.01); *H01M 2/0262* (2013.01); *H01M 2/0285* (2013.01); *H01M 2/0287* (2013.01); *H01M 10/04* (2013.01); *H01M 10/058* (2013.01); *H01M 10/0525* (2013.01); *H01M 10/0583* (2013.01); *H01M 10/0587* (2013.01); *B29K 2023/06* (2013.01); *B29K 2067/00* (2013.01); *B29K 2105/0097* (2013.01); *B29L 2031/3468* (2013.01); *H01M 2220/20* (2013.01)

(56) References Cited

U.S. PATENT DOCUMENTS

| | | | |
|---|---|---|---|
| 2004/0096735 A1* | 5/2004 | Komatsu | H01M 2/021 429/176 |
| 2006/0172190 A1* | 8/2006 | Kaplin | H01M 2/02 429/161 |
| 2007/0154787 A1 | 7/2007 | Jang et al. | |
| 2007/0154804 A1* | 7/2007 | Kim | H01M 2/0202 429/185 |
| 2007/0180686 A1* | 8/2007 | Woo | H01M 4/13 29/623.1 |
| 2011/0008672 A1 | 1/2011 | Kim | |
| 2012/0115025 A1* | 5/2012 | Kim | H01M 10/0413 429/186 |
| 2012/0141838 A1 | 6/2012 | Lin et al. | |
| 2012/0189895 A1 | 7/2012 | Gutsch et al. | |
| 2012/0202051 A1 | 8/2012 | Iseki et al. | |
| 2013/0266850 A1 | 10/2013 | Hohenthanner | |
| 2013/0288110 A1 | 10/2013 | Schaefer et al. | |
| 2015/0010797 A1* | 1/2015 | Kim | H01M 2/1686 429/94 |
| 2017/0062776 A1* | 3/2017 | Woehrle | H01M 2/02 |

FOREIGN PATENT DOCUMENTS

| | | |
|---|---|---|
| DE | 689 27 555 T2 | 7/1997 |
| DE | 601 05 076 T2 | 9/2005 |
| DE | 10 2008 061 011 A1 | 6/2010 |
| DE | 10 2009 013 345 A1 | 9/2010 |
| DE | 10 2010 050 040 A1 | 5/2012 |
| DE | 10 2010 050 046 A1 | 5/2012 |
| DE | 10 2011 084 692 A1 | 6/2012 |
| DE | 10 2011 003 741 A1 | 8/2012 |
| DE | 10 2012 107 370 A1 | 2/2014 |
| GB | 2 056 401 A | 3/1981 |
| WO | WO 2012/120443 A1 | 9/2012 |

OTHER PUBLICATIONS

Chinese-language Office Action issued in counterpart Chinese Application No. 201580004898.2 dated Dec. 25, 2017 with English translation (Thirteen (13) pages).

International Search Report (PCT/ISA/220 & PCT/ISA/210) issued in PCT Application No. PCT/EP2015/052907 dated May 20, 2015 with English translation (eight pages).

German-language Written Opinion (PCT/ISA/237) issued in PCT Application No. PCT/EP2015/052907 dated May 20, 2015 (six pages).

German Search Report issued in counterpart German Application No. 10 2014 206 890.8 dated Jan. 28, 2015 with partial English translation (11 pages).

* cited by examiner

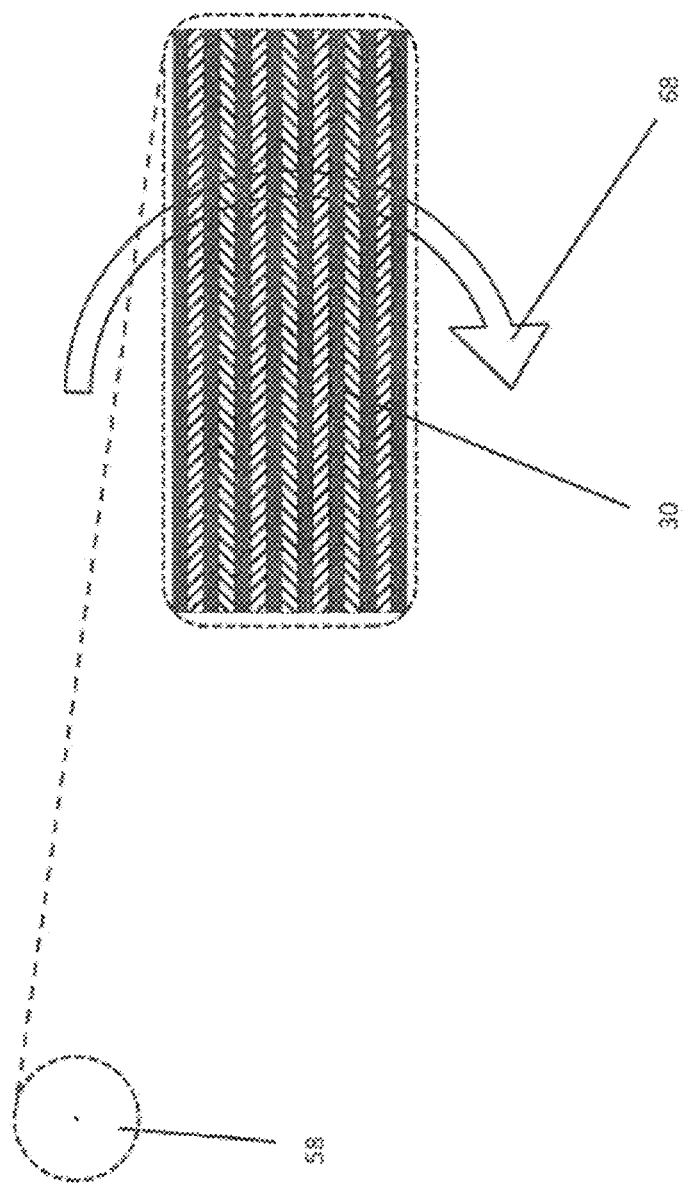

METHOD AND APPARATUS FOR APPLYING A SELF-ADHESIVE FILM TO AN ELECTRICAL ENERGY STORAGE CELL

CROSS REFERENCE TO RELATED APPLICATIONS

This application is a continuation of PCT International Application No. PCT/EP2015/052907, filed Feb. 12, 2015, which claims priority under 35 U.S.C. § 119 from German Patent Application No. 10 2014 206 890.8, filed Apr. 10, 2014, the entire disclosures of which are herein expressly incorporated by reference.

BACKGROUND AND SUMMARY OF THE INVENTION

The embodiments of the invention relate to a method and to a device for the at least partial production of an electrical energy storage cell. The energy storage cell has a storage cell housing in which there is accommodated an electrode/separator arrangement which is required for the operation of the energy storage cell. The electrode/separator arrangement has a layer structure a sequence of cathode layers and anode layers, in which opposite cathode and anode layers are in each case separated from one another by a separator layer which is in particular of porous form.

Electrical energy storage cells constructed in this way may be used for example for the construction of a traction battery which is installed in a hybrid vehicle or electric vehicle. Hybrid or electric vehicles have an electric machine as a drive machine, which electric machine is supplied with electrical energy from a traction battery. In the case of a hybrid vehicle, aside from the electric machine, a further assembly, generally an internal combustion engine, is used for drive purposes. By contrast, an electric vehicle is driven exclusively by an electric machine. The electric machines that are used are generally designed as internal-rotor machines, in the case of which a rotatably mounted rotor is surrounded by a position fixed stator. As drive machines, use may be made of synchronous machines, in particular hybrid synchronous machines.

A traction battery is an electrical high-voltage store which may have a voltage level of 250 to 420 V. To attain this voltage level, a traction battery is constructed from a large number of energy storage cells connected in series. Here, the energy storage cells are normally combined or interconnected to form relatively small groups, the so-called energy storage modules, in which the energy storage modules are connected in series with one another to form the traction battery. In the automotive sector, for the construction of a traction battery, use is made, inter alia, of lithium-ion storage cells.

It is possible to produce electrode/separator arrangements which have a layer structure, in the case of which the opposite cathode and anode layers are in each case separated from one another by a separator layer. In particular, there are methods for electrode/separator arrangements which are in lithium-ion storage cells. In three of these production methods, the materials from which the electrode/separator arrangement is constructed, specifically the cathode material, the anode material and the separator material, are stocked as roll goods. The starting materials for the production process are thus roll goods; the materials required for the production of the electrode/separator arrangement are supplied for processing as roll goods.

If the energy storage cell is in the form of a lithium-ion storage cell, the cathode, that is to say the positive electrode, is generally an assembled electrode, a so-called composite electrode. Said composite electrode is composed of the active material itself, an electrical conductive additive, which may for example be conductive soot, and an electrode binding agent, for example polyvinylidene fluoride (PVDF), and is applied to an aluminum foil, the so-called collector foil, in the form of a layer. The anode, that is to say the negative electrode, is generally likewise an assembled composite electrode. In this case, the composite electrode is likewise composed of the active material itself, for example graphite, and an electrical conductive additive, for example conductive soot, and an electrode binding agent, which may for example be carboxymethyl cellulose (CMC) or styrene-butadiene rubber (SBR), in which said composite electrode is applied in the form of a layer to a copper foil which acts as collector foil. The coated aluminum foil corresponds to the abovementioned cathode material. The coated copper foil corresponds to the abovementioned anode material. The separator material is normally a polymer foil which permits a passage of ions required for the operation of the energy storage cell, that is to say which is of correspondingly porous form.

In a first production method, the so-called stacking method, the separator material, anode material and cathode material, stocked in each case as roll goods, are unwound from the respective roll, are cut to size in accordance with the geometrical requirements of the electrode/separator arrangement, and then provided as individual cathode layers, anode layers and separator layers and placed in a stacking container, in which during the placement of the individual layers into the stacking container, a certain sequence is adhered to, such that opposite cathode and anode layers are in each case separated by a separator layer. Altogether, this yields a loose layer structure, a so-called stack or stacking.

In a second production method, the so-called flat winding method, a total of four rolls of electrode material are provided: one roll with cathode material, one roll with anode material and two rolls with separator material. The electrode material unwound from the four rolls is supplied, for example via a diverting roller at which the four separate electrode materials are brought together or placed together or united, to a rotating receiving body, on which said electrode materials are then wound. Here, the four rolls are arranged relative to one another for example so as to yield the following layer sequence for the four electrode materials brought together: cathode material, separator material, anode material, separator material. When a predefined number of layers of the brought-together electrode material have been wound on the receiving body, the electrode material that has been wound on is separated, by cutting, from the further electrode material provided as roll goods, and is subsequently formed into shape. Altogether, with this loose winding of the positive and negative electrodes, a wound layer structure, a so-called cell wrap (jelly roll, abbreviation JR) is realized.

In a third production method, the so-called Z-fold method, an anode material, a cathode material and a separator material are stocked as roll material. The three electrode materials are unwound and are connected to one another for example by way of a roll pair to which they are supplied, in which the anode material and the cathode material are separated from one another by the separator material situated between them. Here, both the anode material and the cathode material are coated with electrochemically active material only on the side facing toward the separator material. The electrode materials connected to one another in this way are arranged, by way of diverting rollers, to form a Z-folded layer structure, in which the diverting rollers are spaced apart from one another correspondingly to the dimensions of the electrode/separator arrangement to be manufactured.

Aside from the abovementioned three production methods, a further, there exists a fourth production method, the so-called Z-folding method with separated electrodes. In this production method, only the separator material is stocked as roll goods. Cut-to-size anode material plates are pushed into the unwound separator material from one side, and likewise cut-to-size cathode material plates are pushed in from the other side, such that a Z-folded layer structure is realized in this case too.

Both in the case of the first production method, the stacking method, and in the case of the third production method, the Z-folding method, and in the case of the fourth production method, the Z-folding method with separated electrodes, the electrodes are neither curved nor bent.

All four of the above-described production methods have in common the fact that the individual electrode or separator layers or plies are not fixedly connected to one another. This has the effect that both the individual electrode layers, that is to say the anode layers and the cathode layers, and the individual separator layers, can move or be displaced (for example under mechanical stress). This can give rise, during the further processing or machining of the electrode/separator arrangements, to errors in the electrode positioning, which may have the effect that the cathode no long lies, in encircling fashion, in the area of the anode, which in turn can lead to lithium plating, which can cause internal leaks in the energy storage cell. Corresponding energy storage cells must be sorted out as rejects.

In particular in the case of electrode/separator arrangements that are produced by way of the stacking method (first production method), the following problem may also arise: during the further processing or machining, the electrode/separator arrangement may fan out. This can give rise, during the introduction of the electrode/separator arrangement into a solid housing composed of metal, also referred to as a hard case, to damage to individual anode layers, cathode layers and/or separator layers. If forming of the electrode/separator arrangement also has to be performed, said damage can give rise to safety-critical internal leaks. This is also a reason why electrode/separator arrangements produced in this way, the so-called stack variant, are normally accommodated in "soft" housings composed of aluminum composite foil. Such housings are also referred to as pouches or soft packs.

It is therefore an object of the embodiments of the present invention to improve existing methods and devices for the at least partial production of an electrical energy storage cell. Firstly, it should be possible for electrode/separator arrangements which have a layer structure with a sequence of cathode layers and anode layers and separator layers which separate opposite layers to be able to be accommodated in storage cell housings of any desired form, specifically independently of the specific design of the layer structure or of the production method used for the production thereof. In association with this, it should be possible to produce energy storage cells which have a high storage capacity, but which are at the same time easy to handle, that is to say can be processed or arranged to form an energy storage module or a traction battery in a simple manner, and which provide adequate protection for the electrode/separator arrangement with respect to external mechanical action. This requirement is met in particular by an energy storage cell in the case of which an electrode/separator arrangement (stack) produced by way of the stacking method is accommodated in a solid metal housing of prismatic form and which preferably has a wall thickness of greater than 0.3 or 0.5 mm (such metal housings are also referred to as hard cases). Furthermore, it should be possible for energy storage cells to be produced inexpensively in a simple manner.

Said object is achieved by way of a method of the type mentioned in the introduction, in which the following steps are carried out:
providing the electrode/separator arrangement,
providing a plastics foil of self-adhesive form,
applying the self-adhesive plastics foil to at least a subregion of the arrangement surface.

The object is furthermore achieved by way of a device of the type mentioned in the introduction, which has the following means: an arrangement provision unit which is designed for providing the electrode/separator arrangement, a foil provision unit which is designed for providing a plastics foil of self-adhesive form, and an application unit which is designed for applying the self-adhesive plastics foil to at least a subregion of the arrangement surface.

By way of the plastics foil applied to at least a subregion of the arrangement surface, the original position of the cathode layers, of the anode layers and of the separator layers with respect to one another is fixed in particular in the long term, that is to say a situation is prevented in which individual layers move or are displaced relative to one another. Altogether, the original position of the electrodes and of the separator within an electrode/separator arrangement thus remains fixed. In particular in the case of electrode/separator arrangements which are produced by way of the stacking method, it is thus ensured that these cannot fan out during further processing or machining thereof. It is thus possible for an electrode/separator arrangement produced by way of the stacking method to be introduced or accommodated in a solid metal housing (hard case) of prismatic form, and thus for an energy storage cell to be produced which has a high storage capacity and optimum volume utilization of the electrodes in the abovementioned metal housing, while at the same time being easy to handle. By virtue of the fact that the plastics foil is of self-adhesive form, it is possible to dispense with the use of additional adhesive. That is to say, instead of a plastics foil with an adhesive layer applied thereto, such as, for example, from adhesive tapes which are used for packaging purposes, use may be made of a plastics foil without an adhesive layer of said type. This has numerous positive effects. Firstly, it is thereby possible to save not inconsiderable material costs, because adhesive that must possibly be used is relatively expensive. Secondly, it is possible in this way for the manufacturing time of an energy storage cell to be reduced, because a manufacturing step that is otherwise required for the application of the adhesive can be omitted. Furthermore, the energy storage cell has no adhesive, that is to say has one material fewer, which has the effect that restrictions, which may be associated with the adhesive, with regard to the selection of further materials installed in the energy storage cell are omitted. Since, furthermore, the adhesive layer has a thickness of for example 30 to 50 µm, from the adhesive tapes mentioned above, it is also possible, with a plastics foil of self-adhesive form, to increase the energy density of the energy storage cell.

The abovementioned object is thus achieved in its entirety.

The self-adhesive plastics foil is advantageously in the form of an adhesion foil. This is a soft plastics foil which is furthermore of very smooth form and which adheres, without additional adhesive, to smooth surfaces in the case of an electrode/separator arrangement to be introduced into an energy storage cell, to the electrodes or separator surfaces. Said adhesion is effected by so-called Van der Waals bonds, which are formed between the boundary layer of the plastics foil and the boundary layer of the material against which the plastics foil bears. Thus, fixing of the individual layers of the electrode/separator arrangement is possible without additional adhesive, for example in the form of an above-described adhesive layer.

With the method according to the embodiments of the invention, it is ideally possible, for differently produced electrode/separator arrangements, that is to say inter alia for an electrode/separator arrangement which has a loose layer structure or a Z-folded layer structure or a wound layer structure, for the individual layers to be fixed. It is thus possible for an electrode/separator arrangement which has a layer structure to be inserted or accommodated in a storage cell housing of any desired form. In particular, an electrode/separator arrangement produced by way of the stacking method can be inserted or accommodated in a solid metal housing of prismatic form. In this refinement, an energy storage cell can be produced which has a high storage capacity, while at the same time being easy to handle.

Aside from the electrode/separator arrangements mentioned above, yet further electrode/separator arrangements of alternative design and/or construction to which the method according to the embodiments of the invention can be applied or which can be processed by way of the device according to the embodiments of the invention, for example so-called partially laminated electrode/separator arrangements. This is generally an electrode/separator arrangement in the case of which a part of the cathode layers, of the anode layers and of the separator layers from which the electrode/separator arrangement is constructed is adhesively bonded to one another to form a layer composite, that is to say a partially laminated electrode/separator arrangement has at least one such layer composite or is composed of multiple such layer composites. A layer composite of said type, which is also referred to as a bi-cell, has a number of anode and cathode layers and separator layers separating these, for example in a sequence of negative electrode, separator, positive electrode, separator, negative electrode, or in a sequence of positive electrode, separator, negative electrode, separator, positive electrode, in which the number of layers connected to one another may also be greater. In the case of a partially laminated electrode/separator arrangement, multiple embodiments are conceivable. In a first embodiment, multiple such layer composites may be stacked one on top of the other. Alternatively, such layer composites may be applied, in alternating polarity, to a separator material, and the partially laminated electrode/separator arrangement may then be formed by winding or folding.

The application is advantageously performed by winding the self-adhesive plastics foil onto the electrode/separator arrangement. With this measure, the plastics foil can be applied to the electrode/separator arrangement in a simple manner. Here, the plastics foil may be stocked or provided as roll goods. By rotating the electrode/separator arrangement, it is then possible for the required amount of plastics foil to be unwound from the roll and wound onto the electrode/separator arrangement. Furthermore, a reproducible and defined application of the plastics foil to the electrode/separator arrangement is ensured, which permits reliable production of the energy storage cells and ensures excellent compression of the layer structure of the electrode/separator arrangement.

It is advantageous for at least one ply of the self-adhesive plastics foil to be wound onto the electrode/separator arrangement. This measure ensures that the individual layers of the electrode/separator arrangement are acted on by the plastics foil uniformly from all sides, with regard to the arrangement surface around which the winding is performed, and thus reliably fixed, in association with this, the electrode/separator arrangement is, with regard to the arrangement surface around which the winding is performed, protected to the greatest possible extent with respect to external action. In the case of a plastics foil applied in one ply, it is preferably not the case that the start of the plastics foil and the end of the plastics foil form a joint. Rather, it should be the case that, in a small region in relation to the entire arrangement surface around which the winding is to be performed, there is an overlap between the start of the plastics foil and the end of the plastics foil, and there is thus a lower and an upper plastics foil in said region.

It is preferable for two plies of the self-adhesive plastics foil to be wound on the electrode/separator arrangement. By way of the second winding, it is achieved that the plastics foil adheres to itself, whereby improved compression and thus fixing of the individual layers is achieved.

In a further step, the plastics foil applied to the arrangement surface is severed from the further provided, non-applied plastics foil. It is thus possible for the plastics foil to be provided as roll goods, whereby the method according to the embodiments of the invention is very easy to implement overall. The step of the severing preferably follows the step of the application, which is advantageous in particular if the plastics foil is wound onto the electrode/separator arrangement. It is however alternatively also conceivable for the step of the severing to be performed before the step of the application. Said step sequence may for example be selected if cut-to-length, for example strip-like plastics foil pieces are applied to the electrode/separator arrangement.

In a further step which follows the application of the self-adhesive plastics foil, the introduction of the electrode/separator arrangement into the storage cell housing is performed. The introduction step may directly follow the step of the application, specifically if plastics foil pieces that have already been cut to length are applied to the electrode/separator arrangement. The introduction step may however also follow the severing step, specifically if the plastics foil provided or stocked as roll goods (endless material) is wound onto the electrode/separator arrangement.

The plastics foil may be of elastic form. The elastic and thus stretchable plastics foil permits a particularly good introduction of force and thus compression and accordingly fixing of the individual layers. It is preferably possible for a stretchable foil such as is used for the packaging of foodstuffs to be used. Such foils, referred to as "cling film", are inexpensive to purchase because they constitute a product produced in large amounts. The stretchable foil is advantageously of tear-resistant design, which leads to high process reliability, whereby the energy storage cells can be produced with high reliability. Alternatively, use may be made of a foil which is otherwise used in the field of packaging or securing articles to be transported. Such foils are referred to as "stretch foil".

The plastics foil may be composed of a polyolefin. Said polymers are distinguished by the fact that they exhibit adequate electrochemical or chemical stability, which is necessary with regard to the electrolyte situated in the energy storage cell. The plastics foil is preferably composed of polyethylene, with which particularly good results can be achieved with regard to the fixing of the individual layers of the electrode/separator arrangement. Furthermore, plastics foils composed of polyethylene are particularly inexpensive because they constitute mass products. Polyester foils, for example foils composed of polyethylene terephthalate (PET), may also be used.

It has been found that good results are achieved with a plastics foil which has a thickness of 5 to 50 µm. Use is preferably made of a plastics foil which has a thickness of 10 to 30 µm. Use is particularly preferably made of a plastics foil which has a thickness of 12 to 18 µm under some circumstances even of 12 to 15 µm. The plastics foils mentioned above are distinguished by the fact that, in the use thereof, neither the mass nor the volume of the wound electrode/separator arrangement, and thus also of the energy storage cell, is significantly increased.

The plastics foil may be of perforated form at least in a subregion Use is preferably made of a fully perforated plastics foil, that is to say a plastics foil which is perforated not only in a subregion but over the full extent. The perforated, in particular macro-perforated plastics foil has, at least in a subregion, an arrangement of through holes, in which the individual holes may be in a regular or irregular arrangement. The individual holes may be formed into the plastics foil by way of a perforation process or by way of a punching process. A plastics foil which is perforated at least in a sub region has the advantage that the liquid electrolyte can wet the electrodes and the separator in an even more effective manner. Furthermore, through the use of a foil of said type, the specific energy is increased. Alternatively, use may be made of a solid plastics foil, that is to say a plastics foil which does not have an arrangement of through holes.

Alternatively, use may be made of a plastics foil which is furthermore elongated. Such a foil is distinguished by relatively high stability.

The storage cell housing, into which the electrode/separator arrangement is to be introduced, is preferably a housing formed from metal or a housing formed from a composite foil, in particular aluminum composite foil. The housing formed from metal should be a hard or solid housing which preferably has a wall thickness of at least 0.3 or 0.5 mm. A housing of said type is also referred to, in technical linguistic usage, as a hard case. The housing formed from a composite foil is a housing in the form of a packaging. Such packaging-like storage cell housings are also referred to as pouches or soft packs. In particular if the housing is an abovementioned solid housing formed from metal, it is possible to produce an energy storage cell which has a high storage capacity and which is at the same time easy to handle. It has been found that energy storage cells produced by way of the method according to the embodiments of the invention or by way of the device according to the embodiments of the invention have an increased service life. This can be attributed to the improved contacting which arises from the (slight) mechanical pressure exerted by the plastics foil on the electrode/separator arrangement, that is to say on the ensemble of the electrodes with separator. This applies in particular to energy storage cells in the form of lithium-ion storage cells. Not only is the service life of the individual energy storage cells according to the embodiments of the invention increased, but also the service life of an energy storage module or of a traction battery in which such energy storage cells are installed.

With the method according to the embodiments of the invention and the device according to the embodiments of the invention, it is possible for all of the electrodes and separators required in an energy storage cell to be formed into a shape such that these can be connected to the terminals of the energy storage cell and inserted into the storage cell housing.

In particular if, with the method according to the embodiments of the invention or using the device according to the embodiments of the invention, an electrode/separator arrangement produced by way of the stacking method or an electrode/separator arrangement produced by way of the Z-folding method or an electrode/separator arrangement produced by way of the Z-folding method with separated electrodes is wrapped, by winding, with the plastics foil of self-adhesive form, and said wrapped electrode/separator arrangement is then introduced into a metallic housing which has a wall thickness of greater than 0.3 or 0.5 mm, an energy storage cell with increased energy density and thus increased storage capacity and improved service life can be produced.

Other objects, advantages and novel features of the embodiments of the present invention will become apparent from the following detailed description of one or more preferred embodiments when considered in conjunction with the accompanying drawings, in which:

BRIEF DESCRIPTION OF THE DRAWINGS

FIG. 4 is a schematic illustration of the application of a plastics foil of self-adhesive form to an electrode/separator arrangement.

DETAILED DESCRIPTION OF THE DRAWINGS

Figure 1:
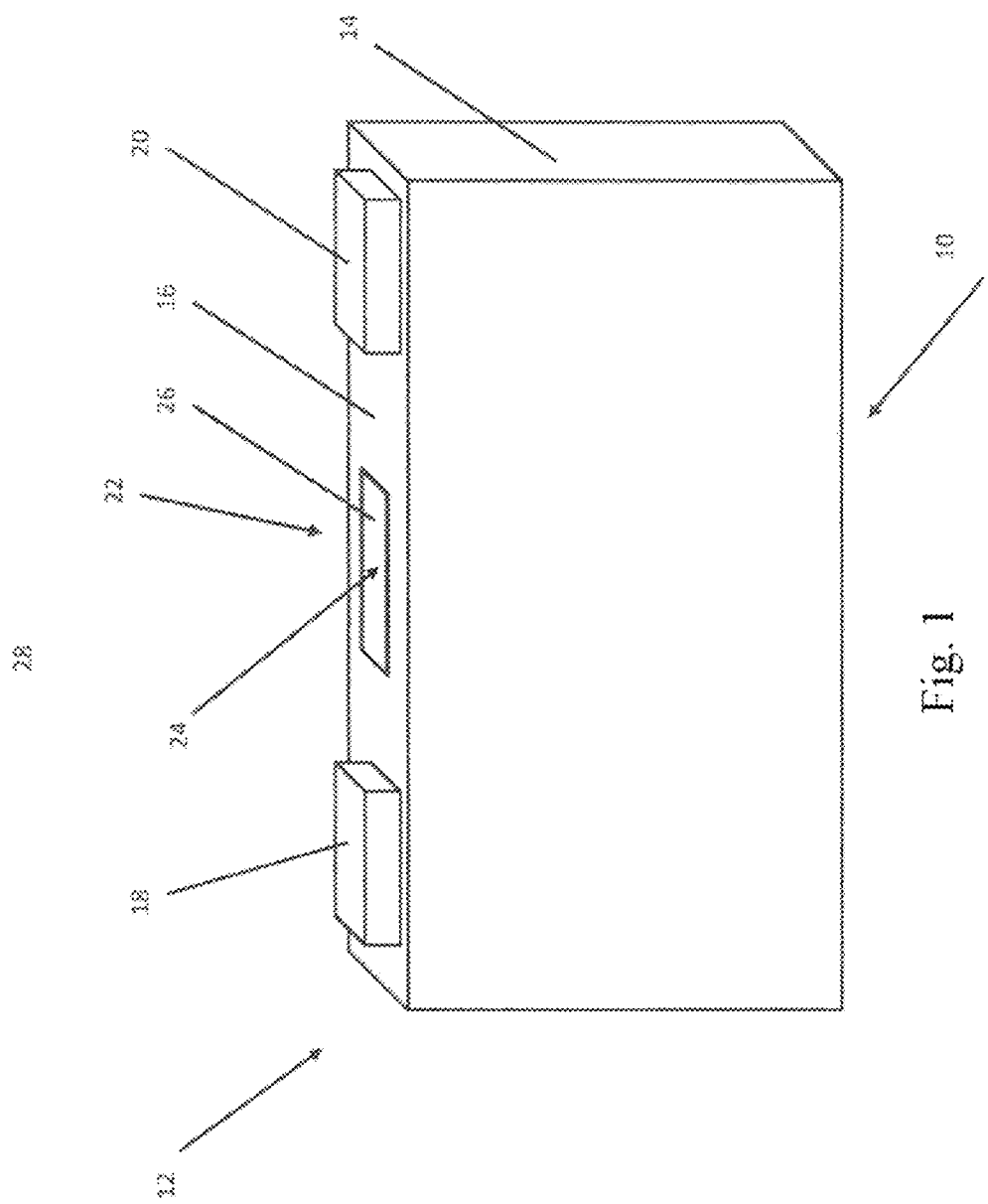
FIG. 1 is a schematic illustration of a basic construction of a prismatic energy storage cell.

FIG. 1 shows, on the basis of a schematic illustration, the basic construction of an electrical energy storage cell 10, which can also be referred to as a battery cell. As can be seen from the illustration in FIG. 1, the energy storage cell is an energy storage cell of prismatic form. The energy storage cell 10 has a storage cell housing 12 which has a multiplicity of housing walls, of which one is denoted, by way of example, by the reference numeral 14. One of the housing walls is the cover 16 of the energy storage cell 10. On the cover 16 there are provided two terminals 18, 20, in which the terminal 18 is intended to be the positive terminal and the terminal 20 the negative terminal of the energy storage cell 10. Furthermore, the cover 16 has a housing opening 22 with an opening region 24. In the region of the housing opening 22 there is arranged a ventilation element 26 which closes off the housing opening 22 with respect to surroundings 28 of the energy storage cell 10. Via the ventilation element 26, pressurized gases can escape from the interior of the energy storage cell 10, whereby an explosion of the energy storage cell 10 in the event of a malfunction can be prevented.

The fact that the energy storage cell illustrated in FIG. 1 is a prismatic energy storage cell is not intended to have any limiting effect with regard to the statements below. It is self-evidently possible for an electrode/separator arrangement produced in accordance with the method according to the embodiments of the invention or by way of the device according to the embodiments of the invention to also be accommodated in a storage cell housing of some other design, for example in a housing constructed from an aluminum composite foil.

With the method according to the embodiments of the invention or with the device according to the embodiments of the invention, it is made possible for an electrode/separator arrangement which has a layer structure to be able to be accommodated in a storage cell housing of any desired design. Below, with the aid of FIG. 2, the construction of the layer structure, which has already been described multiple times, will be discussed once again in detail.

Figure 2:
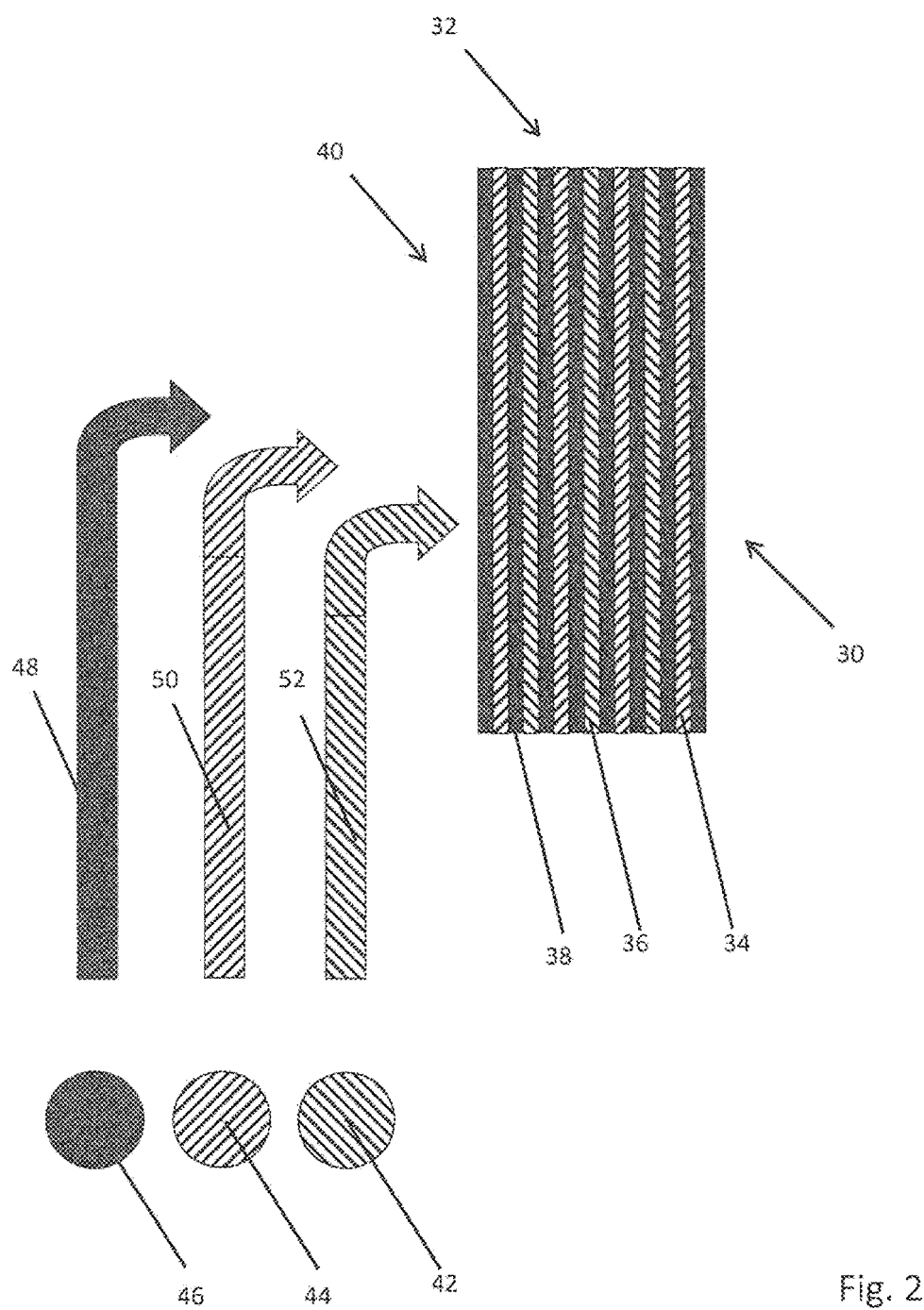
FIG. 2 is a schematic illustration of an electrode/separator arrangement which has a layer structure.

As can be seen from the illustration in FIG. 2, an electrode/separator arrangement 30 produced by way of the method according to the embodiments of the invention or by way of the device according to the embodiments of the invention has a layer structure 32, which in turn has a sequence of anode layers and cathode layers, in which one of the anode layers is denoted by the reference numeral 34, and one of the cathode layers is denoted by the reference numeral 36. As also emerges from the illustration, the anode layers 34 and cathode layers 36 are separated from one another by separator layers, of which one is denoted by the reference numeral 38. The electrode/separator arrangement 30 has an arrangement surface 40, to which a self-adhesive plastics foil is to be applied. The materials from which the electrode/separator arrangement 30 is constructed are stocked or provided as roll goods, as indicated in FIG. 2 by a roll 42 for the cathode material, a roll 44 for the anode material and a roll 46 for the separator material. The anode material, the cathode material and the separator material are processed to form the electrode/separator arrangement 30 with the aid of one of the production methods described in the introduction, specifically the stacking method or the flat winding method or the Z-folding method or the Z-folding method with separated electrodes, as indicated by arrows 48, 50, 52.

Even though it would appear from the illustration of FIG. 2 that the electrode/separator arrangement 30 which is shown, and which is thus to be introduced into a storage cell housing, has, owing to the illustrated arrangement of the anode layers 34, of the cathode layers 36 and of the separator layers 38, been produced by way of the stacking method, and thus constitutes a loose layer structure, this is not intended to have any limiting effect. The statements made in conjunction with FIG. 2 also apply correspondingly to electrode/separator arrangements that have been produced by way of one of the other production methods, that is to say also for a Z-folded layer structure or a wound layer structure, but also to the partially laminated electrode/separator arrangements described in the introduction.

As can be seen from the illustration in FIG. 2, the electrode material 30 to be introduced into the storage cell housing has a layer structure with a multiplicity of layer sequences, in which the layer sequences are composed of anode layers 34, cathode layers 36 and interposed separator layers 38.

Figure 3:
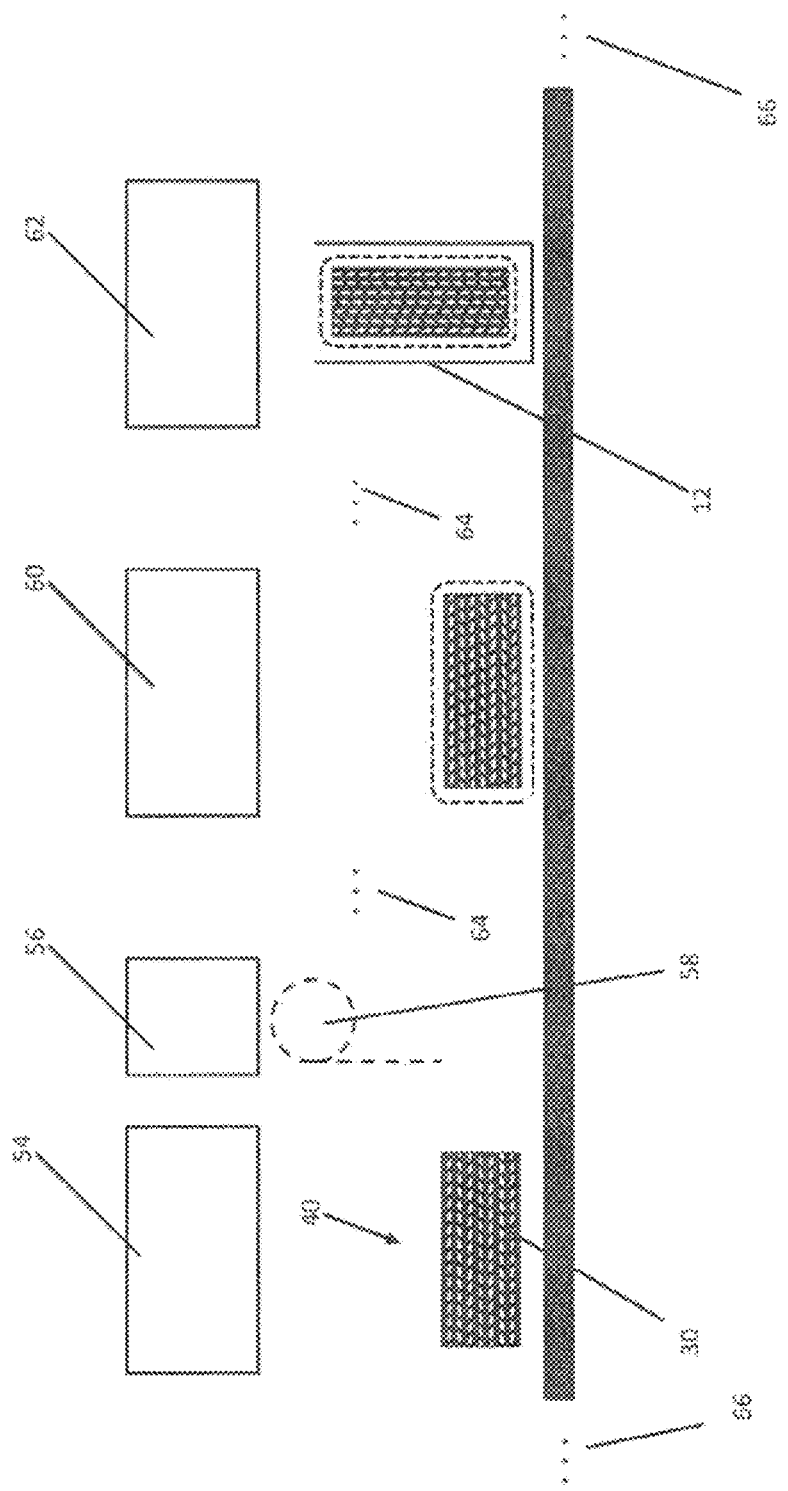
FIG. 3 is a schematic illustration of an overview of the sequence of the method, and an overview of the construction of the device.
Figure 5A:
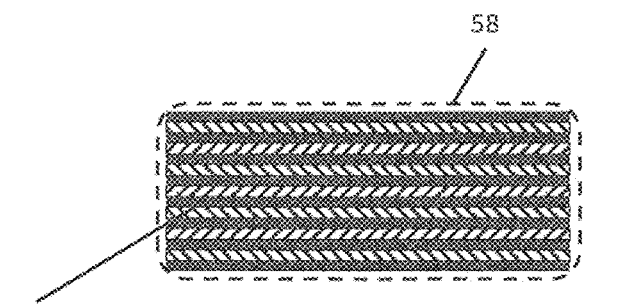
FIGS. 5a-5d are schematic illustrations of an electrode/separator arrangements with a plastics foil wrapped around them in different ways.
Figure 5B:
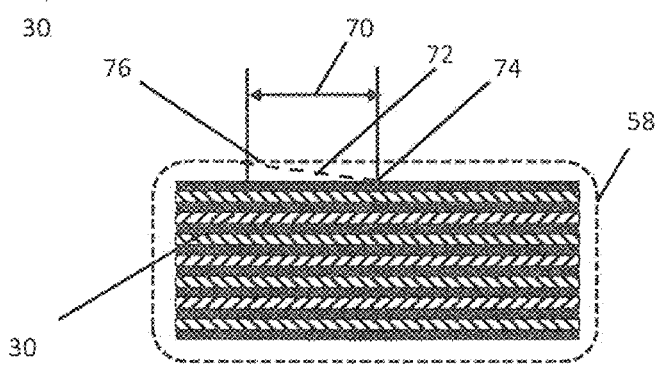
Figure 5C:
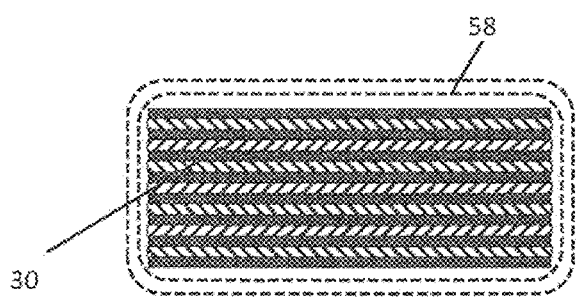
Figure 5D:
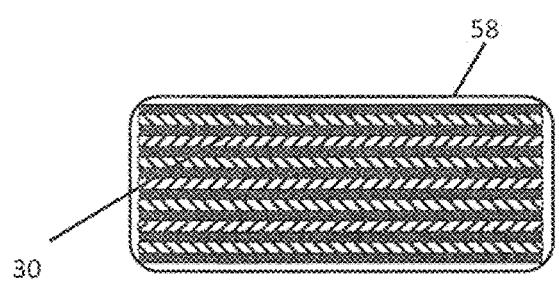

FIG. 3 gives an overview of the sequence of the method according to the embodiments of the invention and of the construction of the device according to the embodiments of the invention. In a first step, by way of an arrangement provision unit 54, an electrode/separator arrangement 30 is provided. In a further step, by way of a foil provision unit 56, a plastics foil 58 of self-adhesive form is provided. In a further step, by way of an application unit 60, the self-adhesive plastics foil 58 is applied to at least a subregion of the arrangement surface. In a further, subsequent step, the electrode/separator arrangement 30 wrapped in the plastics foil 58 of self-adhesive form is inserted into a storage cell housing 12 by way of an introduction unit 62. Regardless of the illustration of the storage cell housing selected in FIG. 3, said storage cell housing may be a housing formed from metal, which preferably has a wall thickness of greater than 0.3 or 0.5 mm. Alternatively, it may be a housing constructed from a composite foil, in particular an aluminum composite foil.

By way of a severing unit which is correspondingly designed for this purpose, but which is not illustrated in FIG. 3 for the sake of clarity, the plastics foil 58 which is to be applied, or which has been applied, to the arrangement surface 40 is, in a further step, severed from the further provided, non-applied plastics foil 58. As already stated in the introduction, the severing step may follow the application step or be performed before the application step, as indicated in FIG. 3 by dots 64. Accordingly, the introduction of the electrode/separator arrangement equipped with the plastics foil of self-adhesive form into the storage cell housing may either directly or indirectly follow the application of the plastics foil to the electrode/separator arrangement.

It is also indicated in FIG. 3, by way of further dots 66, that the method according to the embodiments of the invention, or the steps belonging to said method, constitute a part of the overall production process or of the steps by way of which an energy storage cell is fully produced. In other words: the method according to the embodiments of the invention relates to a part of the production of an energy storage cell.

At this juncture, it is also pointed out that the illustration selected in FIG. 3, which shows independent processing units, is not intended to have any limiting effect. It is self-evidently possible for the processing units illustrated separately in FIG. 2 to be combined to form any desired number of combined processing units, or to form a single overall processing unit.

FIG. 4 schematically shows the application of a plastics foil 58 of self-adhesive form to an electrode/separator arrangement 30. FIG. 4 shows a possible form of the application, specifically the winding of the self-adhesive plastics foil 58 onto the electrode/separator arrangement 30. For this purpose, the electrode/separator arrangement 30 may be rotated by way of a rotary device which is not illustrated in FIG. 4, as indicated by an arrow 68. By way of the rotational movement of the electrode/separator arrangement 30, the plastics foil 58, which is stocked or provided as roll goods, is unwound from the roll and wound onto the electrode/separator arrangement 30.

FIG. 5 is composed of four sub-figures which show electrode/separator arrangements 30 wrapped with plastics foil 58 in different ways. Sub-FIG. 5a shows an electrode/separator arrangement 30 to which one ply of plastics foil 58 has been applied. Here, as indicated in sub-FIG. 5b, it may be provided that, in a preferably small region 70, an overlap 72 exists between a start 74 and an end 76 of the applied plastics foil 58. Sub-FIG. 5c shows an electrode/separator arrangement 30 to which two plies of the plastics foil 58 have been applied. The illustration by dashed lines in sub-FIGS. 5a, 5b and 5c is intended to indicate that the plastics foil 58 is of perforated form. By contrast, the illustration of the plastics foil 58 by solid lines in sub-FIG. 5d indicates that use may also be made of a non-perforated plastics foil. It is self-evidently possible for the plastics foil shown in the two sub-FIGS. 5b and 5c to also be of non-perforated form.

Figure 6:
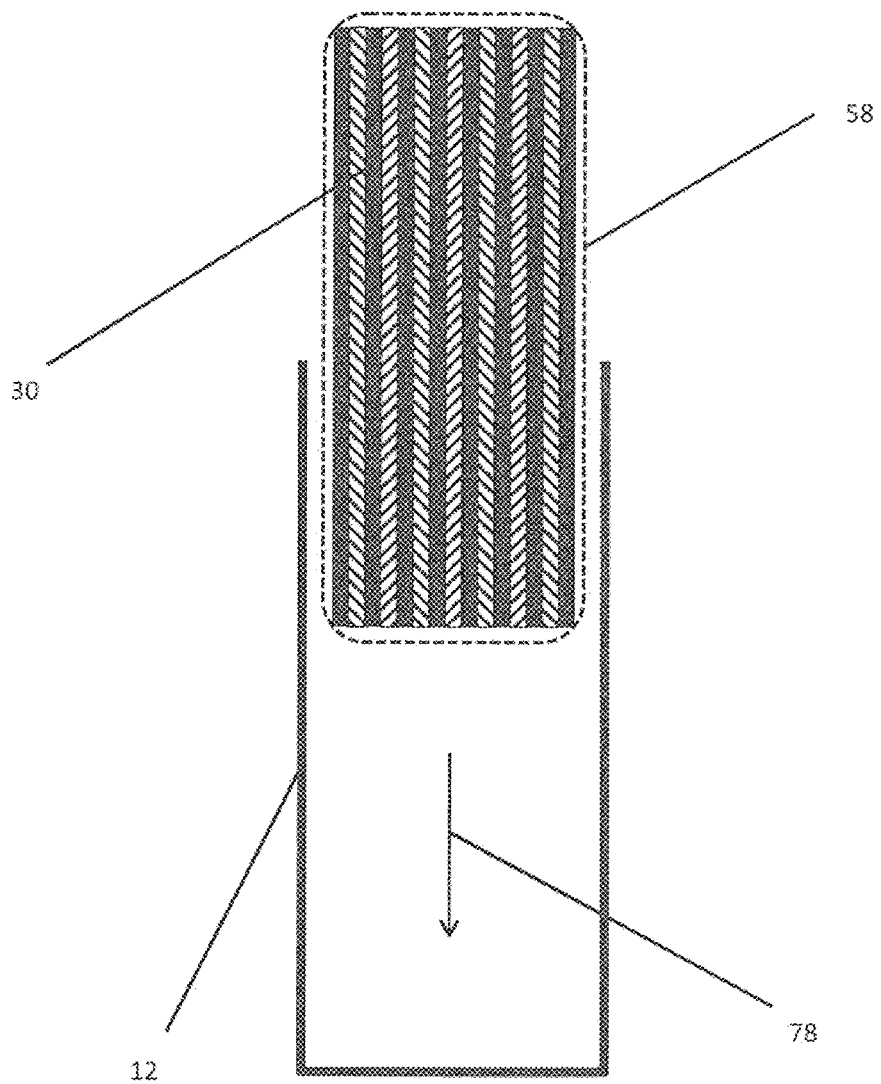
FIG. 6 shows is a schematic illustration of the introduction of an electrode/separator arrangement equipped with a plastics foil into a storage cell housing.

FIG. 6 once again shows the introduction of the electrode/separator arrangement 30 equipped with a plastics foil 58 into a storage cell housing 12, as indicated by an arrow 78.

As already stated, the plastics foil may be of elastic form, may be composed of a polyolefin, in particular of polyethylene, or of a polyester, and may have a thickness of 5 to 50 μm, preferably 10 to 30 μm, particularly preferably 12 to 18 μm.

LIST OF REFERENCE NUMERALS

10 Energy storage cell
12 Storage cell housing
14 Housing wall
16 Cover
18 Positive terminal
20 Negative terminal
22 Housing opening
24 Opening region
26 Ventilation element
28 Surroundings
30 Electrode/separator arrangement
32 Layer structure
34 Anode layer
36 Cathode layer
38 Separator layer
40 Arrangement surface
42 Roll
44 Roll
46 Roll
48 Arrow
50 Arrow
52 Arrow
54 Arrangement provision unit
56 Foil provision unit
58 Plastics foil
60 Application unit
62 Introduction unit
64 Dots
66 Dots
68 Arrow
70 Region
72 Overlap
74 Start
76 End
78 Arrow The foregoing disclosure has been set merely to illustrate the embodiments of the invention and is not intended to be limiting. Since modifications of the disclosed embodiments incorporating the spirit and substance of the embodiments of the invention may occur to persons in the art, the embodiments of the invention should be construed to include everything within the scope of the appended claims and equivalents thereof.

What is claimed is:

1. A method for the at least partial production of an electrical energy storage cell, the energy storage cell having a storage cell housing in which there is accommodated an electrode/separator arrangement which is required for the operation of the energy storage cell, the electrode/separator arrangement having a layer structure with a sequence of cathode layers and anode layers, opposite cathode and anode layers being in each case separated from one another by a separator layer which is in of a porous form, and the electrode/separator arrangement having an arrangement surface, the method comprising the acts of:
   providing the electrode/separator arrangement;
   providing a plastics foil of self-adhesive form;
   applying the self-adhesive plastics foil to at least a subregion of the arrangement surface, wherein
      the provided electrode/separator arrangement has a loose layer structure or a Z-folded layer structure or a wound layer structure, and
      the application is performed by winding the self-adhesive plastics foil onto the electrode/separator arrangement.

2. The method as claimed in claim 1, wherein at least one layer, preferably two layers, of the self-adhesive plastics foil is/are wound on the electrode/separator arrangement.

3. The method as claimed in claim 2, wherein the plastics foil is of elastic form.

4. The method as claimed in claim 3, wherein the plastics foil is composed of a polyolefin, in particular of polyethylene, or of a polyester.

5. The method as claimed in claim 4, wherein the plastics foil has a thickness of 5 to 50 μm, preferably 10 to 30 μm, particularly preferably 12 to 18 μm.

6. The method as claimed in claim 5, wherein the plastics foil is of perforated form at least in a subregion.

7. The method as claimed in claim 6, further comprising: severing the plastics foil applied to the arrangement surface from the further provided, non-applied plastics foil.

8. The method as claimed in claim 7, wherein following the application of the plastics foil the method further comprises: introducing the electrode/separator arrangement into the storage cell housing.

9. The method as claimed in claim 8, wherein the storage cell housing is a housing formed from metal or is a housing formed from a composite foil, in particular aluminum composite foil.

10. An energy storage module having an electrical energy storage cell produced by way of a method as claimed in claim 9.

11. A traction battery having an electrical energy storage cell produced by way of a method as claimed in claim 9.

12. The method as claimed in claim 1, wherein the winding is performed so that the self-adhesive plastics foil contacts at least four different surfaces of the electrode/separator arrangement.

13. A device for the at least partial production of an electrical energy storage cell, the energy storage cell having a storage cell housing in which there is accommodated an electrode/separator arrangement which is required for the operation of the energy storage cell, the electrode/separator arrangement having a layer structure with a sequence of cathode layers and anode layers, opposite cathode and anode layers being in each case separated from one another by a separator layer which is in particular of porous form, and the electrode/separator arrangement having an arrangement surface (40), the device comprising:
   an arrangement provision unit which is designed for providing the electrode/separator arrangement;
   a foil provision unit which is designed for providing a plastics foil of self-adhesive form; and
   an application unit which is designed for applying the self-adhesive plastics foil to at least a subregion of the arrangement surface, wherein the provided electrode/separator arrangement has a loose layer structure or a Z-folded layer structure or a wound layer structure, and the application is performed by winding the self-adhesive plastics foil onto the electrode/separator arrangement.

14. The device as claimed in claim 13, wherein the self-adhesive plastics foil contacts at least four different surfaces of the electrode/separator arrangement.

15. A device for the at least partial production of an electrical energy storage cell, the energy storage cell having a storage cell housing in which there is accommodated an electrode/separator arrangement which is required for the operation of the energy storage cell, the electrode/separator arrangement having a layer structure with a sequence of cathode layers and anode layers, opposite cathode and anode layers being in each case separated from one another by a separator layer which is in particular of porous form, and the electrode/separator arrangement having an arrangement surface (40), the device comprising:

an arrangement provision unit which is designed for providing the electrode/separator arrangement;

a foil provision unit which is designed for providing a plastics foil of self-adhesive form; and an application unit which is designed for applying the self-adhesive plastics foil to at least a subregion of the arrangement surface, wherein the self-adhesive plastics foil contacts at least four different surfaces of the electrode/separator arrangement.

* * * * *